(12) United States Patent
Preston et al.

(10) Patent No.: US 11,885,691 B2
(45) Date of Patent: Jan. 30, 2024

(54) METHOD AND ASSEMBLY FOR A WIRELESS PROBE AND INTERROGATOR

(71) Applicants: Philip Preston, Northfield, IL (US); Walter Raczynski, Arlington Heights, IL (US); Charles Zimnicki, Lake Zurich, IL (US)

(72) Inventors: Philip Preston, Northfield, IL (US); Walter Raczynski, Arlington Heights, IL (US); Charles Zimnicki, Lake Zurich, IL (US)

(73) Assignee: Preston Industries, Inc., Niles, IL (US)

( * ) Notice: Subject to any disclaimer, the term of this patent is extended or adjusted under 35 U.S.C. 154(b) by 0 days.

(21) Appl. No.: 16/558,948

(22) Filed: Sep. 3, 2019

(65) Prior Publication Data
US 2020/0003628 A1 Jan. 2, 2020

Related U.S. Application Data

(63) Continuation-in-part of application No. 15/670,762, filed on Aug. 7, 2017, now abandoned.

(51) Int. Cl.
*G01K 1/024* (2021.01)
*G01K 13/00* (2021.01)

(52) U.S. Cl.
CPC ............ *G01K 1/024* (2013.01); *G01K 13/00* (2013.01); *G01K 2207/06* (2013.01)

(58) Field of Classification Search
CPC .... G01K 1/024; G01K 13/00; G01K 2207/06; G01K 2215/00
See application file for complete search history.

(56) References Cited

U.S. PATENT DOCUMENTS

| | | | | |
|---|---|---|---|---|
| 9,341,518 | B2 * | 5/2016 | Batti | ........................ G01F 23/22 |
| 2006/0045167 | A1 | 3/2006 | Pawlenko et al. | |
| 2006/0196057 | A1 * | 9/2006 | So | ........................ A47J 45/068 |
| | | | | 30/322 |
| 2008/0043809 | A1 * | 2/2008 | Herbert | .................. G01K 1/026 |
| | | | | 374/163 |

(Continued)

FOREIGN PATENT DOCUMENTS

| | | |
|---|---|---|
| CN | 101529164 A | 9/2009 |
| CN | 105531571 A | 4/2016 |
| CN | 105987772 A | 10/2016 |

OTHER PUBLICATIONS

PCT International Preliminary Report on Patentability—7 Pages—dated Feb. 20, 2020.

(Continued)

*Primary Examiner* — Brandi N Hopkins
*Assistant Examiner* — Janice M Soto
(74) *Attorney, Agent, or Firm* — Vitale, Vickrey, Niro, Solon & Gasey, LLP (57) ABSTRACT

A method and system for the wireless interrogation of a body immersed in a circulatory bath or a tank for heating. More specifically, the system may include a probe having multiple sensors for gauging a core temperature associated with the immersed body in combination with one or more wireless connections leading to a controller (on a circulator or a user interface) such that the user can determine temperature information (e.g., core temperature) of the body being immersed.

3 Claims, 10 Drawing Sheets

(56) References Cited

U.S. PATENT DOCUMENTS

| | | | |
|---|---|---|---|
| 2009/0242545 A1* | 10/2009 | Matsumoto | G01K 1/026 |
| | | | 219/448.11 |
| 2010/0012645 A1* | 1/2010 | Baier | G01K 13/00 |
| | | | 219/413 |
| 2017/0089768 A1* | 3/2017 | Wu | G01K 1/024 |
| 2018/0058940 A1* | 3/2018 | Lawler, Jr. | G01K 1/024 |
| 2018/0116437 A1* | 5/2018 | Armstrong | F24C 7/082 |

OTHER PUBLICATIONS

Search Report dated Jan. 2, 2022 issued with Jan. 19, 2022 Office Action in corresponding Chinese Application No. 2018800503971.

* cited by examiner

METHOD AND ASSEMBLY FOR A WIRELESS PROBE AND INTERROGATOR

RELATED APPLICATION DATA

This application is a continuation in part of U.S. patent application Ser. No. 15/670,762, filed Aug. 7, 2017.

FIELD OF THE DISCLOSURE

The present disclosure relates generally to a method and system for the wireless interrogation of the state of a body, enclosed in a sealed pouch and immersed in a circulatory fluid bath or tank for heating and/or cooling. More specifically, the present disclosure is directed towards a sensing probe-containing multiple thermal sensors for data enabling the determination of the core and surface (or distribution of internal) temperatures associated with the immersed body in combination with one or more wireless connections leading to a controller (on a laboratory or kitchen thermal circulator device or via some intermediary means, itself connected to said controller) such that the user or the algorithm embedded within the controller of the circulator can determine temperature information (e.g., core temperature) of the immersed body and, optionally act upon this 'closed-loop' information to control the cooking process appropriate to the food contained in the sealed pouch disposed in the heated bath. The wireless data can also be sent to an independent data logging device for specific food safety purposes and/or compliance with health department or other regulations governing food-safety record-keeping.

BACKGROUND OF THE INVENTION

Conventional thermometers (e.g., meat thermometers) have been used to help provide enhanced information in order for users to be enabled to obtain more consistent results for cooking and laboratory applications. The use of a meat thermometer, for example, can provide a visual indication on whether the meat is still undercooked or if the meat is in danger of being overcooked. However, these conventional types of food thermometers provide a passive indication of temperature and generally rely on the cook to remember to check the temperature and to act upon this additional information. This creates problems insofar as cook or laboratory personnel may lack the requisite experience, discipline, be distracted or the sample or food being processed may be unfamiliar, or the style of food preparation may be new to the cook. In particular, such a conventional thermometer may prove unusable for certain cooking or laboratory environments, such as sous vide style cooking and similar heated baths for laboratory environments where the food or materials are not accessible to a piercing-type probe because using such a thermometers to monitor materials or foodstuffs contained in a bag would pierce the bag and certainly elevate and amplify pathogen risk to the elevated temperature environment of the food being cooked.

More recently, wireless food thermometers have been introduced to provide a more convenient display of the temperature. However, such wireless food thermometers generally provide only a passive display of the temperature and may not provide sufficiently accurate or detailed information during cooking, such as a completion time, when to adjust a temperature, when to start or finish a particular cooking stage such as searing, or how long to let the food rest after removing it from heat. Additionally such wireless food thermometers are predicated on a single sensing element which must be expertly "bulls-eyed" so as to monitor the "core" temperature of the foodstuff. Also, such wireless food thermometers do not provide machine-readable versions of this information such that a controller associated with applying heat to the bath could use to "steer" the cooking process variables. In addition, such wireless food thermometers have a limited range for transmitting information, especially in light of the challenges to conserve space, provide a waterproof enclosure, and withstand elevated cooking or process temperatures. Moreover, such products may have limited transmitting capability due to the composition of the cookware or lab hardware being used. Moreover, such approaches may require an "on board" power source, such as a battery, to enable such wireless communication. Such an approach is undesirable and even dangerous for a food application such as sous vide, and may prove infeasible for a body (whether a lab sample or food source) that must be refrigerated prior to being placed in a heated bath.

To date, Applicant believes that there are no thermometer, communication and interrogation systems which provide a battery-free wireless system for readily measuring distributed temperature profiles of the foodstuffs or materials and deriving cook or heating time information to a machine intelligence contained in a circulator, and/or to the cook or for a laboratory technician to control an experiment or process variable.

What is needed is a wireless thermometer and interrogator system for using with a sample or foodstuff in a circulating elevated or depressed temperature water bath with an internal reliable antenna or other wireless data transmitting and receiving device and a transmitter for querying and a receiver for receiving a variety of temperature data and providing an accurate summary of processed temperature information (e.g., determining the material or foodstuffs core temperature, remaining cook time) therefrom.

Definition of Terms

The following terms are used in the claims of the patent as filed and are intended to have their broadest plain and ordinary meaning consistent with the requirements of the law:

A very low frequency signal is a radio signal having a frequency below 1 MHz and preferably on the order of less than 500 KHz, in the event of a non-conductive pot or bath container, and preferably on the order of 500 KHz-1 MHz in the event of a conductive pot or bath container.

A very high frequency (GHz-THz) signal are electromagnetic signals in the infrared or visible light spectrum, in the case of infrared this signal can occupy frequencies from 300 GHz to 430 THz and in the case of visible light, this signal can occupy frequencies from 430-790 THz. The equivalent structure to an RF Antenna in these frequency regimes for transmitting a signal is a photo emitter, such as an LED and for receiving a signal is a photo detector, such as a solar cell or PIN diode, etc.

A light transmitter is an infrared or visible light transmitter (such as a LED with suitable emission characteristics)

A light harvester is a solar cell, phototransistor or PIN photodiode with appropriate sensitivity characteristics A probe array is a structure for placing in a body that includes multiple temperature sensors and a transmitter and an antenna or equivalent structure.

A body is the protein or sample being measured by an inserted wireless probe, both of which are contained in a sealed pouch and which are placed in a container having a heating and circulation device serving as a thermal immersion bath.

Where alternative meanings are possible, the broadest meaning is intended. All words used in the claims set forth below are intended to be used in the normal, customary usage of grammar and the English language.

SUMMARY OF THE INVENTION

The present invention relates to one or more of the following features, elements or combinations thereof.

The Applicants have invented a probe assembly for providing distributed internal body temperature data for a body in a sealed pouch and immersed in a bath (either in a laboratory setting or kitchen, such as sous vide) to a remote interrogator outside of the bath. The probe most preferably includes a rigid member (for ease of insertion), though variants of the present invention may incorporate non- and semi-rigid members also (e.g., reminiscent in rigidity of a coffee stirrer or soda straw).

The probe array includes a first end and a second end, and a shaft extending between the two ends. The first end of the probe is inserted into a body (whether a protein for cooking purposes or a laboratory sample) and the second end of the probe includes, for low frequency RF signals an antenna and transmitter and receiver (and/or for very high, THz signals, an emitter and detector) and an electronic chip. The probe further includes multiple temperature sensors disposed along the length of the shaft, with at least one near the first (proximal or "head") end and one at the most distal end. The on-board controller IC receives temperature data from the sensors and stores the temperature data to provide to the antenna in response to interrogation from an interrogating signal. In a light powered embodiment, the probe array includes a capacitor and a light energy harvester (photodetector) electrically for receiving light energy from a remote light source (whether solar or ambient light powered or via another light source) to power the transmitter and chip and to an infrared or visible light transmitter (photoemitter) for sending temperature data back to the interrogating device In this light enabled embodiment, a transmitter sends a very high frequency electromagnetic (infrared or visible light) signal from one or more probes to an interrogating transponder. The light-enabled transponder or circulator requires a physical "window" embedded in its housing that is transparent to electromagnetic energy in the infrared or visible wavelength ranges, and this window can be embedded in the circulator, heated bath, the temperature controlled bath or an attachment. The transponder further optionally includes an LED (behind the same window or a separate window) whose light energy can be harvested by the probes working with the transponder. The signal from the probe(s) is transmitted preferably through a infrared transmitter (emitter, such as an IR LED), preferably by means of a modulated signal using a carrier frequency, similar to a television remote control (though a visible light wavelength may be used as well). The signal can also be sent using infrared with a serial protocol similar to IRDA. In this embodiment, power can also be harvested by the probe from ordinary ambient illumination.

In an alternative, RFID embodiment, the very low frequency antenna on the probe bi-directionally communicates with and receives power transmitted from one or more interrogator antennas. In this alternative embodiment, the chip receives power via the carrier envelope associated with the interrogation signal, so as to avoid the need for a battery that would otherwise be required to power the circuit, though the probe may also include a capacitor for storing energy received from the interrogating signal. This interrogator antenna or antennas can be integral to or added to the body of the bath (e.g., one or more surfaces of a pot, sous vide cooker or laboratory beaker or the like). The interrogator antenna(s) comprises one or more conductive loops surrounding the bath so as to ensure uninterrupted interrogation of the probe. The interrogator antenna further connects—either wirelessly via RF "relay" coils or via a "hard" electrical connection—to an interrogator that takes the multiple temperature sensor readings and interprets their values to determine: 1) what the core temperature is; and 2) what the remaining time is for cooking or remaining in the bath to elevate the core temperature to the level required for that foodstuff or material.

In still further alternative embodiments, the system can involve hybrids or variants of the RFID and light powered embodiments above. For instance, the probe can harvest light energy to enable sensor reading and processing while providing an RFID or other Radio Frequency connection to the interrogator antenna. Yet another embodiment can comprise a probe that harvests light energy to enable sensor reading, while providing an LED emitter for communicating with an LED receiver in place of an antenna at the interrogator.

Thus, it can be seen that one object of the disclosed invention is to provide a probe and interrogatory system that can harvest energy from the environment and wirelessly provide a substantially continuous temperature analysis for a sous vide cooker or equivalent laboratory device such as a precision immersion circulator.

A further object of the present invention is to provide a probe and interrogatory system that wirelessly provides a substantially continuous temperature analysis for laboratory samples in a liquid circulator, heated bath, or temperature controlled bath.

Still another object of the present invention is to provide a probe and interrogatory system that can be used to accurately determine core temperature of a body without concern for a precise probe placement.

Yet another object of the present invention is to provide a probe and interrogatory system that can be used wirelessly in an elevated temperature liquid bath environment.

Still another object of the present invention is to provide a probe and interrogatory system that can be used wirelessly without an on-board battery power source.

Another object of the present invention is to provide a probe and interrogatory system that can be retrofitted to existing cookware and/or laboratory equipment.

Yet another object of the present invention is to reduce a chef's workload from having to determine a protein type, thickness, starting temperature, shape, to merely requiring the chef know the type of protein involved.

It should be noted that not every embodiment of the claimed invention will accomplish each of the objects of the invention set forth above. For instance, certain claimed embodiments of the invention may focus solely upon cooking functions. In addition, further objects of the invention will become apparent based upon the summary of the invention, the detailed description of preferred embodiments, and as illustrated in the accompanying drawings. Such objects, features, and advantages of the present invention will become more apparent in light of the following detailed description of various preferred embodiments thereof, and as illustrated in the accompanying drawings.

DETAILED DESCRIPTION OF EMBODIMENTS OF THE INVENTION

Figure 1:
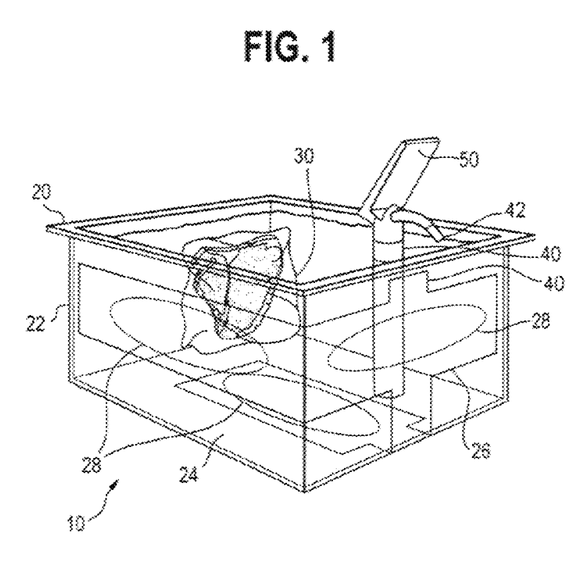
FIG. 1 is a perspective figure of a probe and interrogator assembly in accord with one embodiment of the present invention.
Figure 2A:
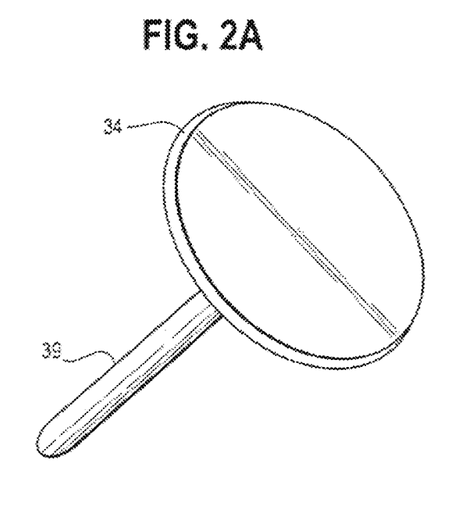
FIGS. 2A and 2B are a side view embodiments of the probe shown in FIG. 1.
Figure 2B:
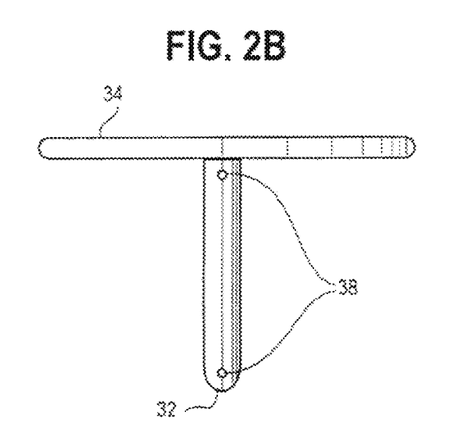
Figure 3:
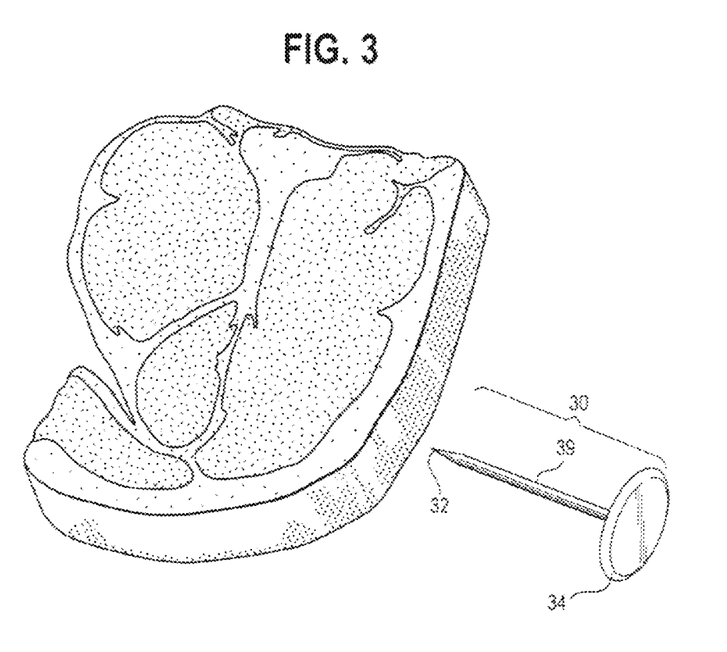
FIG. 3 is a perspective view of the probe shown in FIG. 1 about to be inserted into a protein body.

As can be seen in FIGS. 1-3, one application for an first preferred embodiment of the probe and interrogator assembly 10 is with respect to sous vide cooking (in this case, a steak, though of course other proteins or bodies can likewise be used). In this embodiment, the assembly includes a tank 20 or cooking vessel, a probe 30, a circulator 40 (which can alternatively comprise a heated bath, or integrated temperature controlled bath) and an interrogator 50.

In its radio frequency driven embodiments, the tank 20 is preferably a non-conductive material so as to eliminate any type of "Faraday cage" effect, though this can be offset, among other means, by changing the frequency of the radio communication used with the probe 30 or by judicial placement of the interrogating antenna to be within the bounds of the "Faraday cage". That is, applicant believes that the use of a non-conductive tank permits a much lower frequency (e.g., around 300-400 KHz, such as very low frequency RFID signals) for communicating effectively with the probe, while the use of a conductive tank would require a higher frequency range (e.g., 500 KHz to 1 MHz), while still staying below higher frequency signals that would not work sufficiently in water to interrogate the probe 20.

In this embodiment, the tank 20 includes a bottom 22 and sides 24, each of which has located thereon adhesives 26 with antenna loops 28 located thereon so as to provide antennas in defining a multiplicity of planes so as to ensure robust communication with the probe 30. Alternatively, such antenna loops could be painted on, etched on, affixed decal or applique-like, or molded to the tank. As a further alternative, the tank 20 could include a lid (not shown) with an additional antenna loop.

Figure 4:
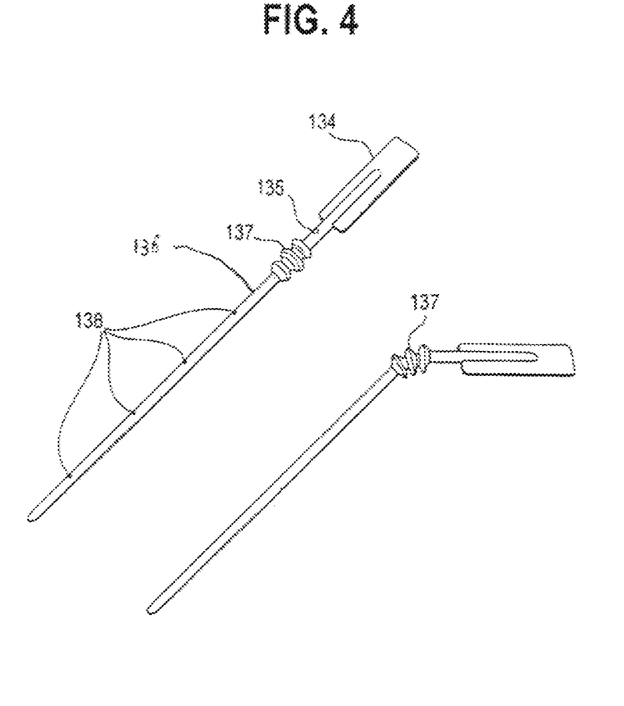
FIG. 4 is an alternative probe configuration of another preferred embodiment of the present invention.

The probe 30 is comprised of a first or distal end 32 or tip and a second or proximal end 34 or head. The second end 34 has an antenna or other data emanating means, such as an IRLED (Infrared LED), depending on the embodiment 35 and a chip or microcontroller 36 located thereon for communication with and receiving power supply from the antenna loops 28. The probe also contains multiple sensors 38 which are linearly displaced along the length or axis of the shaft 39. The probe thus enables readings of different points inside the protein or body upon insertion without burdening the user with a requirement for placement accuracy. As shown in FIG. 4, an alternative version of the probe 130 can include a head 134 with an antenna 135, and a microcontroller 136, as well as a flexible portion 137 (reminiscent of the joint in a bendable straw) for permitting the head 134 to lay flat on the protein after the probe 130 is inserted. Note that in the RF energy harvesting embodiment: the antenna 135 coil preferably comprises approximately 300 turns of @41 enameled wire with an OD of 40 mm and an ID of roughly 30 mm and a thickness of around 1 mm. This iteration of coil can be placed (for instance) on either a microcontroller 136 such as a polyester flexi circuit or a very thin (0.1 mm) FR4.

Figure 5:
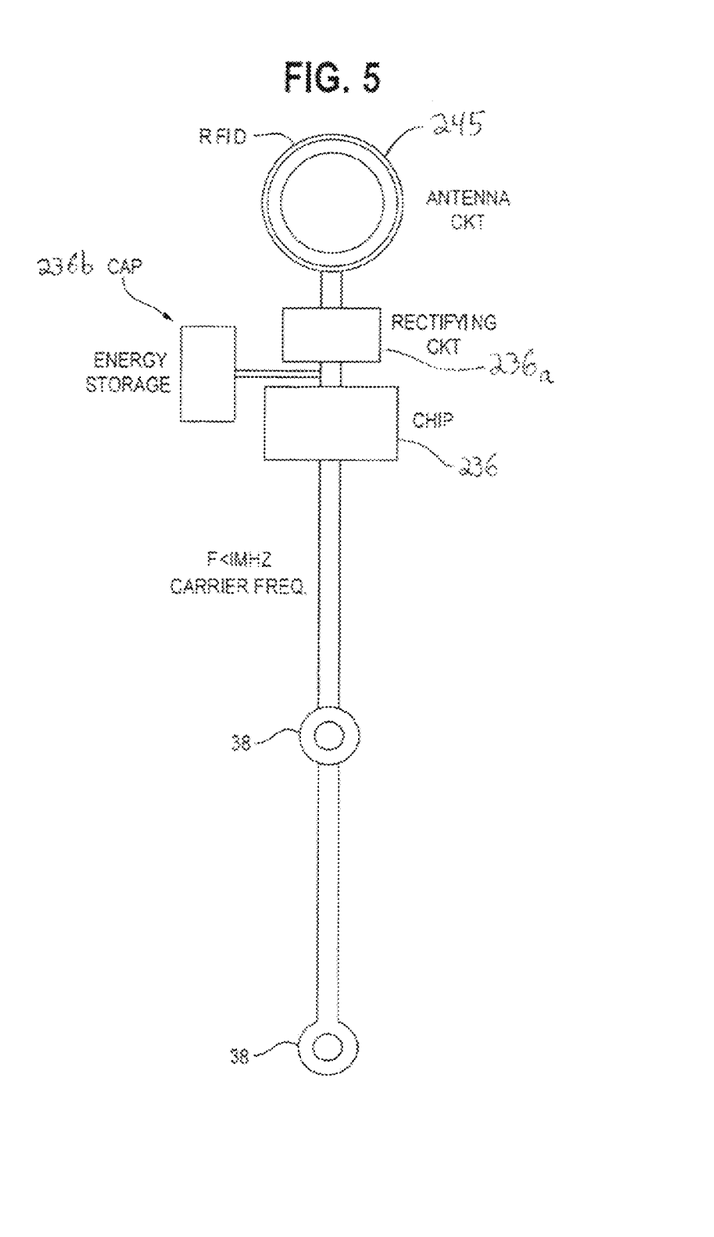
FIG. 5 is a further alternative embodiment showing the probe major components according to yet another preferred embodiment of the present invention.

As show in FIG. 5, In addition to the coil or antenna 245, there is a microcontroller 236 that is preferably a very low power 32 bit microcontroller, a diode 236a and small capacitor 236b (for energy harvesting from the signals being received) and a plurality of thermal sensors 238 placed in a linear spaced-apart fashion, each being read upon every query from the interrogator (not shown) all cooperatively providing a thermal cross-section that includes surface and core temperatures to the querying device.

Figure 6A:
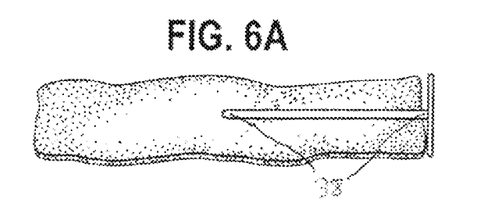
FIGS. 6A, 6B and 6C show different example placements of a probe in accordance with the present invention.
Figure 6B:
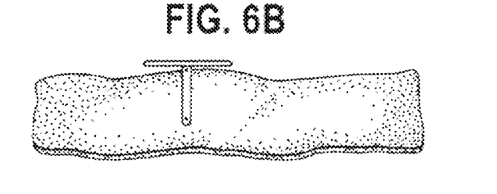
Figure 6C:
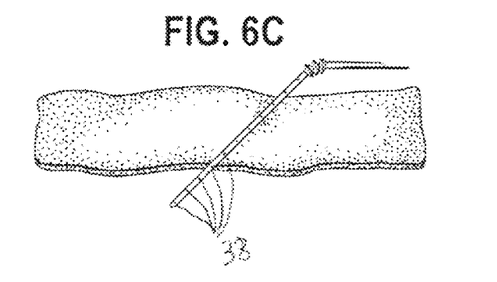
Figure 6D:
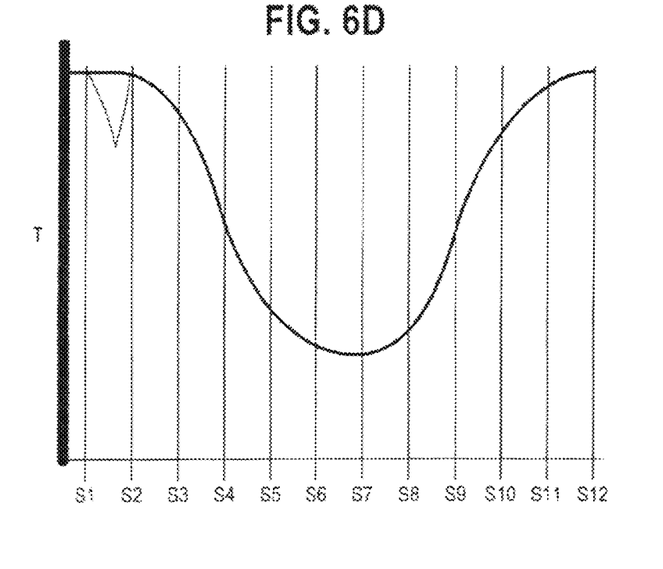
FIG. 6d shows a prophetic example temperature profile for an example tranverse probe insertion into a protein body as shown in FIGS. 6B and 6C in accord with the application of the probe pursuant to the present invention.

Some of the advantages and uses of the probe is shown in FIGS. 6a-c. That is, the probe can be used by the interrogator 50 to determine the core temperature for cooking purposes without concern for precise placement of the probe within the body of the protein. This capability is enabled through the array of sensors 38, each of which has its own associated temperature. Such information, as shown in a prophetic example graphed in FIG. 6d, is shown with each sensor corresponding to an "S" value on the graph. This data is processed by a controller (not shown) in the interrogator 50 (also not shown) whereby the inverse of the temperature (i.e., the coolest temperature) will be interpreted to be the "core" temperature for calculating the remaining time for cooking. Thus, the use of such data processing by the controller reduces a chef's workload from having to determine a protein type, thickness, starting temperature, shape, to merely requiring the chef know the type of protein involved.

The present invention can, therefore, enable virtually automated and pathogen safe cooking, avoiding the requirement for the cook to enter the type and shape of protein, the thickness, done-ness temperature, etc. with the only user input settings being: a) identification of foodstuff (i.e.: steak, chicken, carrots, etc.) and b) time past Pasteurization (which can be thought of as "tenderness time") because as a rule of thumb: connective tissues break-down during prolonged low-temperature cooking times and given sufficient cooking time: even the toughest proteins can become tender. This is one of the principle benefits of sous-vide style cooking:

making tough foods tender without overcooking them. One of the principle benefits of the present invention is to enable sous-vide cooking without requiring the cooking staff to understand the science behind the process and to assure that food pathogens undergo a significant logarithmic reduction of viable cells every time a protein is cooked with the benefit of the closed-loop system that is the present invention.

The circulator 40 is of any standard type of immersion circulator, heated bath, or temperature controlled bath known to be used in laboratory or cooking equipment, and is further electrically connected to a controller 50 or interrogator for taking the data from the probe to provide to a user. The interrogator 50 includes a microcontroller which (in the radio frequency embodiments) scans a band of frequencies (e.g., from about 300-400 kHz) and then calibrates itself to the resonance of the interrogated probe, thus making the system auto-calibrating vis-a-vis "best" frequency. In this embodiment, the circulator 40 further includes a multi loop metallic (RF) relay coil 42 disposed therein, wherein the coil 42 is in close proximity and communicates wirelessly with a reciprocal relay coil antenna 28 on adhesive 26. This coil may be coupled with the coil of the circulator 40. Thus, the circulator generates a very low frequency RFID signal that both powers the probe and receives data from the probe. It should also be understood, however, that the circulator, in alternative embodiments, may be physically connected to the relay coil antenna 28 for providing only a single wireless connection to the probe 30.

Figure 7:
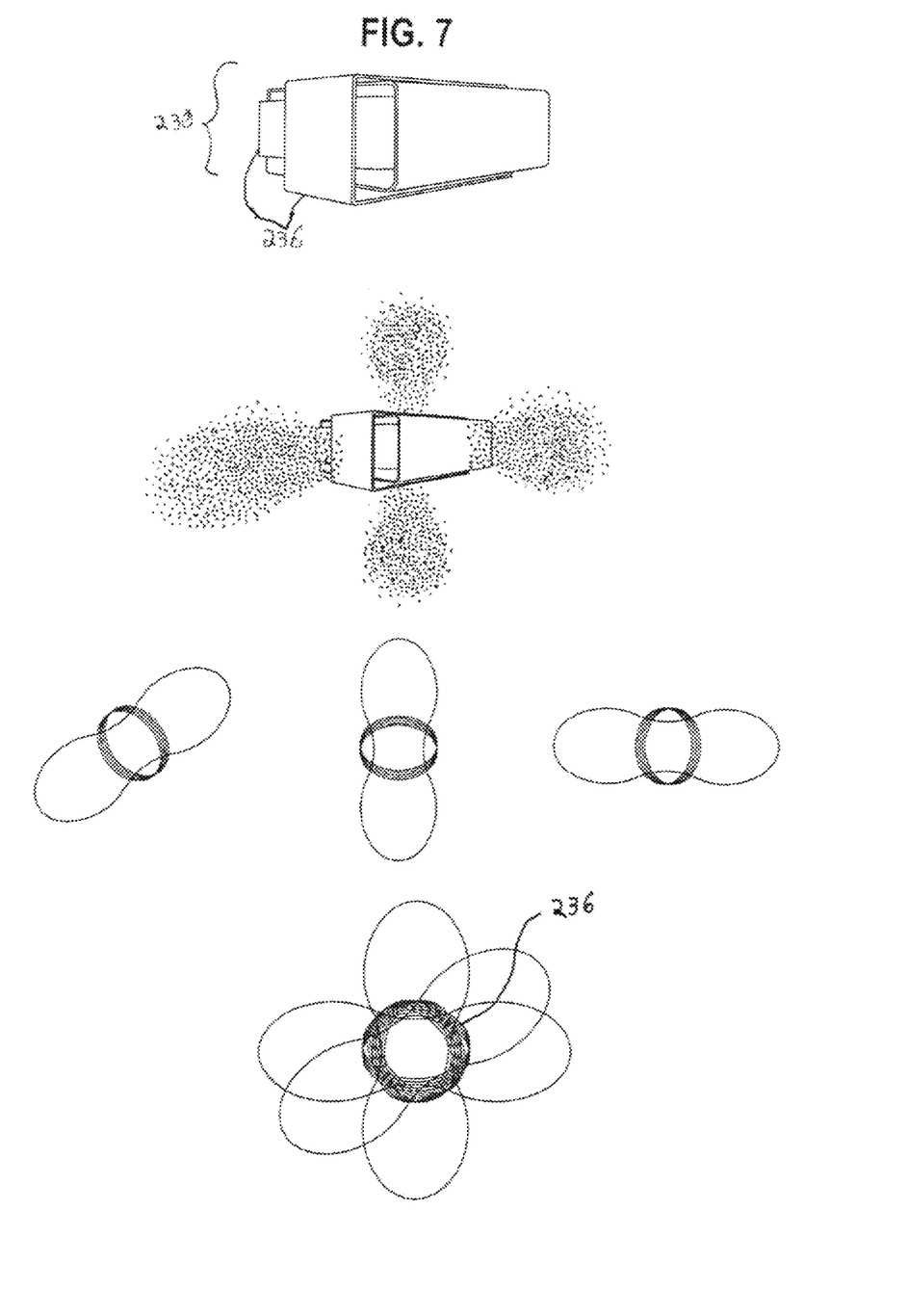
FIG. 7 shows yet another (RF) variant of the probe in accord with still another embodiment of the present invention, showing 3 orthogonal coils.
Figure 8A:
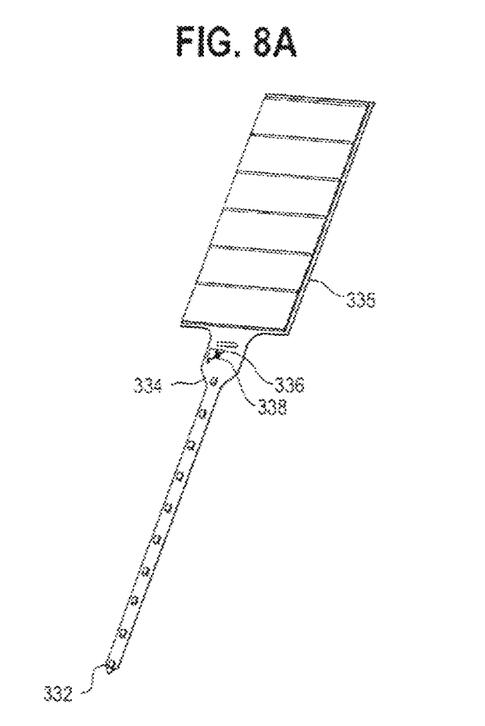
FIGS. 8A and 8B shows an infrared, visible light or solar powered variant of the probe in accordance with yet another embodiment of the present invention.
Figure 8B:
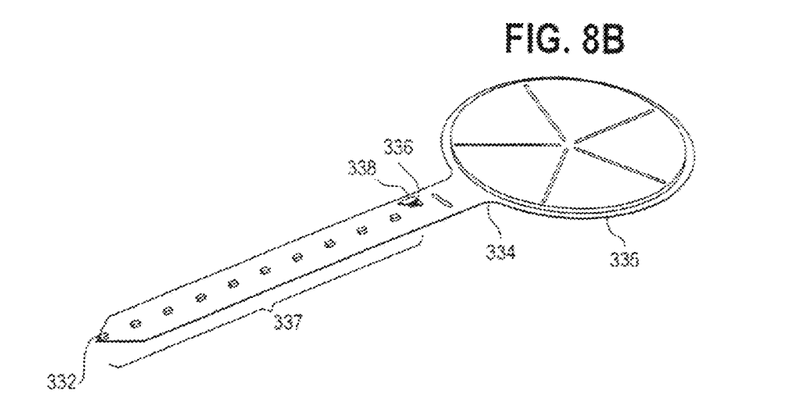
Figure 9A:
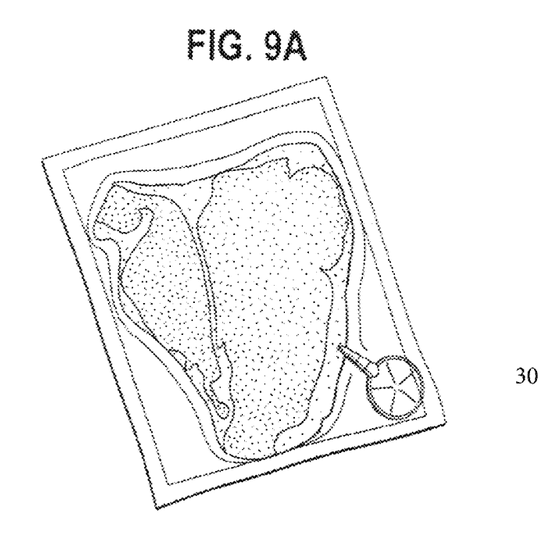
FIGS. 9A and 9B shows elements of still another embodiment of the probe (Light Harvesting) and interrogator assembly in accord with another preferred embodiment of the present invention.
Figure 9B:
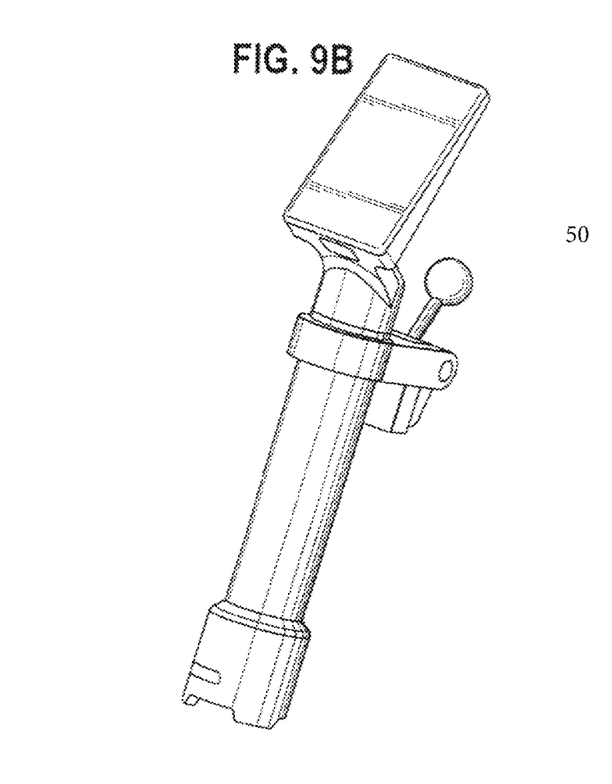

In still further variants of the present invention such as shown in FIG. 7, the probe 230 can include a multidimensional or 3D antenna 236 comprising multiple coils that define multiple planes for superior communication with the interrogator 50. In such an embodiment, it may be possible for the tank to comprise just a single antenna loop 28 surrounding the tank 20, as shown in FIG. 1.

In yet another embodiment of the present invention as shown in FIGS. 8a-b and 9a-b, the probe array of the present invention may involve an infrared or light based probe 330. Among the advantages to this embodiment of the present inventive system is its particular applicability to equipment including a window of transparent material (e.g., glass) for the transmitting of probe signals, particularly with respect to use cases involving water baths (such as sous vide and laboratory environments). On a separate but related point is the ability of such probes to absorb sufficient light energy either from a LED contained in the interrogating unit or even in conjunction with low intensity ambient light levels in order to provide the working voltage needed to operate the probe without requiring a battery.

In this embodiment, the probe 330 is preferably comprised of a transmitter 336 which is preferably a visible light or infrared light transmitter which sends very high frequency light signals (>700 THz) to a transponder 352 such as a photo transistor/photo detector on the interrogator 350. As with the RFID embodiment, this embodiment of the probe 330 involves a first end 332 or tip and a second end 334 or head and a number of sensors 337 on the axis defined therebetween. The probe 330 is in a sealed pouch and the first end 332 is inserted in a foodstuff or protein such that only the second end 334 is exposed from the body of the protein but still within the confines of the sealed pouch. The second end 334 has an energy harvester 335 such as a solar cell, panel or PIN Photodiodes and a chip or microcontroller 338 attached thereto for communication with and receiving power supply from the either ambient light and/or a interrogator window 354 containing a light source (such a LED light) as well as the photo detector or transponder 352 on the interrogator 350. Energy received from the harvester 335 may be stored in a capacitor (not shown) in order to maintain the operation of the chip 338 The transponder 352 receives temperature related data from the chip 338 via the transmitter 336 which is sent preferably through a infrared signal, most preferably through a modulated IR signal using a carrier frequency, similar to a television remote control (though a visible light wavelength may be used as well). The signal can also be sent using infrared with a serial protocol either proprietary in nature or even similar to IRDA so as to avoid unwanted interference from other sources. Once in an interrogator 350, the temperature data may be processed in essentially the same fashion as described with other embodiments above for processing in the control head 356 and providing information to the user via the user interface 358.

Figure 10A:
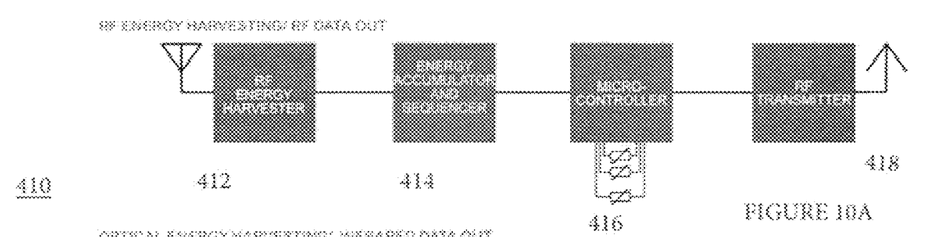
FIGS. 10A, 10B, and 10C show comparative schematics of RF energy harvesting and RF data transmitting, Light harvesting and Light data transmitting and Light harvesting/RF data transmitting "hybrid" embodiments, respectively, of probe assemblies of the present invention.
Figure 10B:
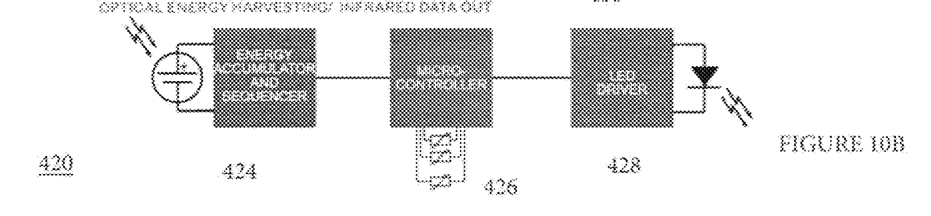
Figure 10C:
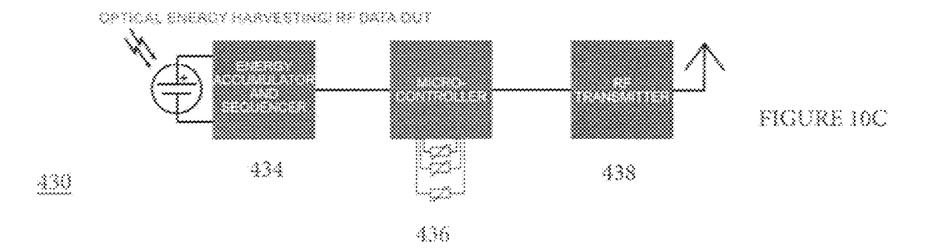

Still other variants of these embodiments may be employed in light of the above teachings, as shown in FIGS. 10a-c. Specifically, FIG. 10a shows an 410 RF based embodiment of the present invention comprising a RF energy harvester 412, an energy accumulator and sequencer 414, a microcontroller 416 and an RF transmitter 418. This embodiment is a simplified block diagram of the probe embodiment disclosed above, for instance, in FIGS. 1-3. By comparison, FIG. 10b shows 420 a light based embodiment of the present invention comprising a combined light based energy accumulator and sequencer 424, a microcontroller 426 and an LED transmitter 428. This embodiment is a simplified block diagram of the probe embodiment disclosed above, for instance, in FIGS. 8-9.

By contrast, FIG. 10c shows 430 a "hybrid" light/RF embodiment of a probe of the present invention comprising a combined light based energy accumulator and sequencer 434, a microcontroller 436 and an RF transmitter 438. Such an embodiment is believed to provide superior strength transmitting capabilities (better range) to that of an LED-based transmitting system (10b) while still taking advantage of the efficiencies of ambient light harvesting so as to enable the inexpensive and efficient powering of the probe functionalities. All of these systems have been fully characterized.

While the disclosure is susceptible to various modifications and alternative forms, specific exemplary embodiments thereof have been shown by way of example in the drawings and have herein been described in detail. It should be understood, for example, that the number and specific locations of the sensors may vary depending upon cost considerations. For example, one of the embodiments used 6 thermal sensing elements disposed along the probe axis. This obtained sufficiently fine-grained temperature-location data and had the advantage of very low cost to produce. Likewise, it may be desirable to port some of the data processing from the interrogator 50 to the microcontroller 36 on the probe. In addition, while the interrogator is preferably not located in the bath of the tank 20, there is no requirement that the user interface has to be connected to the circulator—rather, such information could be ported to a remote computer, an active relay or repeater, or a different device (such as a phone and application). There is no intent to limit the disclosure to the particular embodiments disclosed, but on the contrary, the intention is to cover all modifications, equivalents, and alternatives falling within the spirit and scope of the disclosure as defined by the appended claims.

What is claimed is:

1. A probe and interrogator assembly for monitoring temperature data of at least the interior of a body in a bath, the assembly comprising:

a) an interrogator comprising:
   i) a controller; and
   ii) a transceiver, the transceiver including a plurality of continuous loops rotationally and orthogonally displaced from one another for transmitting a very low frequency signal for powering a remote probe and receiving temperature data from the remote probe; and
b) a probe assembly for providing body temperature data to a remote interrogator outside of a bath containing the body, the probe assembly comprising:
   i) a rigid member having a first end, a second end, and a shaft extending therebetween,
   ii) a first sensor at the first end for providing temperature data related to the interior of the body;
   iii) an antenna at the second end of the rigid member for providing temperature data in response to an interrogation very low frequency signal transmitted by the remote interrogator through the bath; and
   iv) a chip on the second end for receiving temperature data from the first sensor, the chip storing said temperature data to provide to the antenna in response to the interrogation very low frequency signal, and the chip receiving power via the interrogation very low frequency signal.

2. A probe and interrogator assembly for monitoring temperature data of at least the interior of a body in a bath, the assembly comprising:

a) an interrogator comprising:
   i) a controller; and
   ii) a transceiver, the transceiver including a continuous loop for transmitting a very low frequency signal for powering a remote probe and receiving temperature data from the remote probe; and
b) probe assembly for providing body temperature data to a remote interrogator outside of a bath containing the body, the probe assembly comprising:
   i) a member having a first end, a second end, and a shaft extending therebetween;
   ii) a first sensor at the first end for providing temperature data related to the interior of the body;
   iii) an antenna comprising a plurality of continuous loops rotationally and orthogonally displaced from one another at the second end of the rigid member for providing temperature data in response to an interrogation very low frequency signal transmitted by the remote interrogator through the bath; and
   iii) a chip on the second end for receiving temperature data from the first sensor, the chip storing said temperature data to provide to the antenna in response to the interrogation very low frequency signal, and the chip receiving power via the interrogation very low frequency signal.

3. The probe and interrogator assembly of claim 2, wherein the member of the probe assembly is semi rigid.

\* \* \* \* \*